US010809197B2

(12) United States Patent
Richardson

(10) Patent No.: US 10,809,197 B2
(45) Date of Patent: Oct. 20, 2020

(54) DETECTION OF PHYSICAL FORENSIC EVIDENCE

(71) Applicant: Sciluminate Technologies, LLC, Tampa, FL (US)

(72) Inventor: Joseph J. Richardson, St. Petersburg, FL (US)

(73) Assignee: SCILUMINATE TECHNOLOGIES, LLC, Tampa, FL (US)

( * ) Notice: Subject to any disclaimer, the term of this patent is extended or adjusted under 35 U.S.C. 154(b) by 49 days.

(21) Appl. No.: 16/218,522

(22) Filed: Dec. 13, 2018

(65) Prior Publication Data

US 2019/0187055 A1 Jun. 20, 2019

Related U.S. Application Data

(60) Provisional application No. 62/598,533, filed on Dec. 14, 2017.

(51) Int. Cl.
*G01N 21/64* (2006.01)
*C09K 11/77* (2006.01)
(Continued)

(52) U.S. Cl.
CPC ...... *G01N 21/6456* (2013.01); *C09K 11/7743* (2013.01); *G01J 3/10* (2013.01);
(Continued)

(58) Field of Classification Search
CPC ............ G01N 21/6456; G01N 21/643; G01N 21/255; G01N 21/6486; C09K 11/7743; G01J 3/10; G01J 3/4406; G06K 9/0004
See application file for complete search history.

(56) References Cited

U.S. PATENT DOCUMENTS

2016/0349251 A1* 12/2016 Hao ................. G01N 33/54373
2017/0074885 A1 3/2017 Kobus et al.

FOREIGN PATENT DOCUMENTS

CN 102920462 A 2/2013
CN 105694850 A 6/2016
(Continued)

OTHER PUBLICATIONS

Daiguebonne, C. et al. "Structural and Luminescent Properties of Micro- and Nanosized Particles of Lanthanide Terephthalate Coordination Polymers" Inorg. Chem. 2008, 47, 9, 3700-3708.
(Continued)

*Primary Examiner* — David P Porta
*Assistant Examiner* — Meenakshi S Sahu
(74) *Attorney, Agent, or Firm* — Shumaker, Loop & Kendrick, LLP; Jeffrey B. Fabian

(57) ABSTRACT

Detecting physical forensic evidence on a surface includes contacting the surface with a composition, the composition including a rare-earth metal and a chelator. The composition contacting the surface is illuminated with electromagnetic radiation configured to cause the composition to fluoresce in a pattern indicative of physical forensic evidence. The pattern indicative of physical forensic evidence can then be captured. The composition can be made by combining a rare-earth metal, a chelator, and a solvent to form a solution, precipitating the rare-earth metal and the chelator in the solution, and isolating the precipitate of the rare-earth metal and the chelator from a remainder of the solution. The resulting composition includes a porous metal-organic framework of a rare-earth metal and a chelator, where the pores range in diameter from about 0.01 nm to about 50 nm.

20 Claims, 3 Drawing Sheets

(51) Int. Cl.
*G01J 3/10* (2006.01)
*G01J 3/44* (2006.01)
*G01N 21/25* (2006.01)
*G06K 9/00* (2006.01)

(52) U.S. Cl.
CPC .......... *G01J 3/4406* (2013.01); *G01N 21/255* (2013.01); *G01N 21/643* (2013.01); *G01N 21/6486* (2013.01); *G06K 9/0004* (2013.01)

(56) References Cited

FOREIGN PATENT DOCUMENTS

| CN | 106872437 A | 6/2017 |
|----|-------------|--------|
| KR | 20100116866 A | 11/2010 |
| KR | 101476263 B1 | 12/2014 |
| WO | 2005066632 A1 | 7/2005 |

OTHER PUBLICATIONS

Kiang, K. et al. "Biomimetic Replication of Microscopic Metal-Organic Framework Patterns Using Printed Protein Patterns" Adv. Mater. 2015, 27, 7293-7298.

Brittain, Harry G. "Emission intensity of terbium(III) bound to benzene-carboxylic acid derivatives" Journal of Luminescence, vol. 17, Issue 4, Nov.-Dec. 1978, pp. 411-417.

Brittain, Harry G. "Intermolecular energy transfer between lanthanide complexes in aqueous solution—II: Transfer from terbium(III) to europium(III) complexes of phthalic and hemimellitic acids" Journal of Inorganic and Nuclear Chemistry, vol. 41, Issue 4, 1979, pp. 561-565.

* cited by examiner

DETECTION OF PHYSICAL FORENSIC EVIDENCE

FIELD

The present technology relates to compositions and uses thereof in detecting physical forensic evidence, including biomolecules such as proteins; and in particular, to compositions of dry or dispersed particles having a rare-earth metal and a chelator, including ways to using such to detect such evidence and permit imaging and lifting of such evidence.

INTRODUCTION

This section provides background information related to the present disclosure which is not necessarily prior art.

Detection and imaging of various biomolecules can be an important part of various processes, including the detection and accumulation of physical forensic evidence. For example, an individual can leave behind various biomolecules on a surface, especially oils and proteins deposited from the individual's skin following contact with the surface. In certain instances, these biomolecules can be deposited in patterns complementary to the contact made by the individual's skin, including the size, shape, and surface features representative of an extent of contact with the individual's skin. One common example is a fingerprint or latent print resulting from contact between the individual and the surface, where biomolecules and/or other materials originating from or associated with the individual are transferred and deposited on the surface. The surface can include various surfaces, such as surfaces throughout an environment, including a crime scene, and various implements or objects within the environment. Detection of latent prints, for example, is often an important part of the collection of forensic evidence and reconstructing contact occurrences of an individual within an environment and with various objects.

Latent prints include invisible fingerprint impressions left on solid surfaces following surface contact, where the prints can be formed from perspiration on the ridges of an individual's skin where a finger comes in contact with a surface and leaves perspiration behind, making an invisible impression thereon. Perspiration is known to contain water, salt, proteins and amino acids, and oils, which allow impressions to be made therefrom. In some instances, natural oils can preserve the fingerprint, which can be so utterly distinct that no two individuals present the same fingerprints.

Conventional methods for extracting latent prints can involve using chemicals or powders to identify and define the latent print. Such conventional methods can present an immediate dilemma in that they may force an investigator to make a decision as to whether to dust for latent prints versus swabbing for DNA evidence, where swabbing may remove print details or even remove prints in their entirety. Certain surfaces also present challenges in detecting latent prints, especially where the surface is contaminated with or naturally contains one or more components that interact with the chemicals or powders used to identify the latent prints. One such challenge, for example, includes detecting a latent print of an individual present on the skin of another individual. Accordingly, there is a need to optimize the detection, imaging, and collection of physical forensic evidence, including latent prints.

SUMMARY

The present technology includes compositions, systems, and processes that relate to rare-earth metal-containing particles useful in detecting physical forensic evidence.

Rare-earth metal-containing particles can be synthesized, deployed, and utilized in various ways for the detection of biomolecules, including biomolecules related to forensic physical evidence. The compositions provided herein can bind to, and detect, a wide variety of biomolecules and synthetic molecules on diverse surfaces and substrates. Configuration, use, and operation of these compositions in relation to binding various biomolecules can involve rare-earth metal-containing particles that allow for strong capillary and molecular adhesion forces to physically bind the particles to the forensic evidence. Such rare-earth metal-containing particles can be porous and the porosity can be tailored to optimize binding of the particles. The particles can be excited and imaged using a variety of wavelengths of light, including ultraviolet light and visible light. Various ways of making rare-earth metal-containing particles are provided, including the making and use of dry powders and liquid dispersions of the particles, ways of applying the particles, and ways of detecting and capturing a latent print or mark using the particles as described herein.

Detecting physical forensic evidence on a surface can include contacting the surface with a composition, where the composition includes a rare-earth metal and a chelator. The composition contacting the surface can be illuminated with electromagnetic radiation configured to cause the composition to fluoresce in a pattern indicative of physical forensic evidence. The pattern indicative of physical forensic evidence can then be captured. The composition for detecting physical forensic evidence can include a porous metal-organic framework of a rare-earth metal and a chelator, where the porous metal-organic framework of the rare-earth metal and the chelator includes pores ranging in diameter from about 0.01 nm to about 50 nm. The composition can be made by combining a rare-earth metal, a chelator, and a solvent to form a solution. The rare-earth metal and the chelator can be precipitated in the solution and the precipitate can be isolated from a remainder of the solution.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
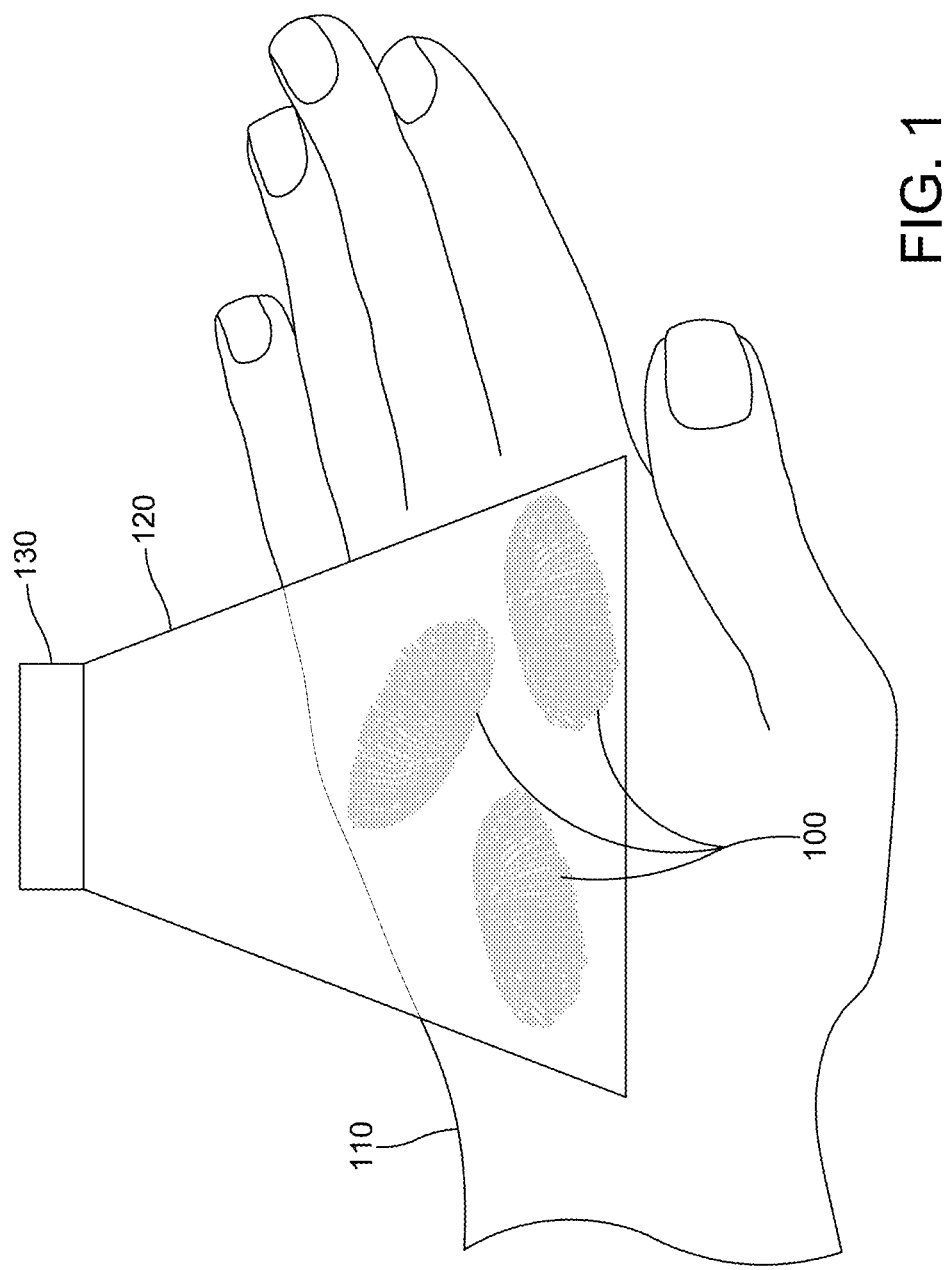
FIG. 1 is a photograph of a latent fingerprint showing visible ridge detail on skin using terbium 1,4-benzenedicarboxylate (Tb-BDC) powder.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

The present technology provides compositions and methods for forming and utilizing rare-earth metal-containing particles that can be used in various ways, including using in the detection, identification, and collection of physical forensic evidence. The compositions provided herein can bind to, and detect, a wide variety of biomolecules and synthetic molecules on diverse surfaces and substrates. Configuration, use, and operation of these compositions in relation to binding various biomolecules can involve rare-earth metal-containing particles. The rare-earth metal-containing particles can be substantially non-porous or can be porous. Porosity can be adjusted, for example by washing the particles with various solvents, where the size and number of the pores can be changed. In certain instances, the rare-earth metal-containing particles can have a porosity having pores ranging in diameter from 0.01 to 50 nm that allow for strong capillary and molecular adhesion forces to physically bind the particles to the forensic evidence. The compositions can then be excited using a variety of wavelengths of ultraviolet (UV) light and importantly can also be excited by visible light, which can minimize UV exposure and minimize safety and health issues related to UV exposure. The compositions can include rare-earth metal-containing particles that can be hybridized with other materials, including various magnetic or fluorescent materials, for improved versatility and incorporation with other technologies. Other important properties include the ability of the present compositions to be used as a standard non-fluorescent powder for a variety of forensic evidence collection, including printing, lifting, and imaging. The compositions based on the rare-earth metal-containing particles are safe, non-toxic, and odorless, and can be excited to fluoresce using hand-based light sources or more powerful light sources in the field or in the lab. Free coordination sites on the rare-earth metal-containing particles can allow chelates to specifically interact with various biomolecules.

The present compositions and methods address certain shortcomings and limitations in the art regarding the detection of biomolecules, such as proteins, including the detection of physical forensic evidence for forensic imaging and lifting. These shortcomings in the art include the fluorescent nature of prior compositions and the limitation of prior compositions and methods for use only on smooth and non-porous surfaces. The following details serve to illustrate these issues.

Fluorescent materials and particles can be used in crime scene investigations to gather forensic evidence. Various organic dyes can be packed together with carrier particles (e.g., silica, titania, etc.) to form a powder that can be dusted on latent fingerprints. However, certain limitations surround the applicability of such materials to various substrates, including the fact that organic dyes can bleach under excitation light, thereby constantly decreasing a fluorescent signal over time until the signal can be fully lost. An alternative to using organic dyes is to use compositions including various semiconductors, as rare-earth metals can absorb light and emit the light back at a different wavelength, including infrared (IR) to visible light emissions. These compositions can be used as a fingerprint powder to allow for the detection of certain latent prints on non-porous smooth glass and metal surfaces. Similarly, quantum dots in the range of 2-30 nm can be used to convert UV light to visible light and can also be applied for detecting latent prints. Quantum dots, however, can be highly toxic, can be expensive and difficult to produce, and can be limited to non-porous, smooth surfaces.

Ideally, a composition used to detect forensic evidence should be usable on all types of surfaces, should be non-toxic, and should allow for detection on a wide variety of materials, other than the standard non-porous materials generally required for common powders, as collected evidence at a crime scene may not necessarily have a non-porous and smooth surface. Moreover, the forensic detection composition should not harm the substrate to which it is applied, and the compositions should be easy to lift and image, both using standard light and using light to excite fluorescence. Important examples of porous materials where it would be desirable to detect biomolecules and latent prints, but which currently cannot be readily analyzed with standard forensic techniques, include materials such as polymer banknotes, paper cups, and wood handled tools, implements, and weapons, to name a few. Footprints, shoe prints, and handprints should also be detectable, but currently require a variety of complex techniques most of which lack generalizability. Finally, different biological fluids and synthetic fluids should be detectable as agents for the prints, namely sebaceous secretions, blood, protein, semen, food, and gasoline, among others.

Improved materials to detect latent prints include rare-earth metal salts chelates and oxides, which can be formed through a variety of techniques depending on the desired final properties and the rare-earth element used. Various rare-earth metal-containing materials can be formed around biomolecules and even latent fingerprints under highly controlled environments. However, the generalizability to non-controlled environments has thus far failed, as other methods and materials use fingerprints pre-coated in proteins and oils before limited detection can be conducted, and the process has to be conducted on smooth, non-porous silicon wafers, and cannot be used on anything else. Or, the materials have to be formed around biomolecules in solution, which has no relevance for forensic print detection. Finally, rare-earth metal compounds have not been used for the different types of prints and marks and on the different materials as described above.

The present technology overcomes these shortcomings and limitations through the formation and use of rare-earth metal-containing particles. In particular, the present compositions and methods afford several benefits and advantages, including the following: detection of evidence on porous surfaces; use of IR and visible light and related emission filters (if necessary) for imaging; having minimal or no toxicity; providing high resolution in imaging due to very small particle size; use without specialized deposition equipment; and the ability to detect biomolecule deposits, including fingerprints, on the surface of skin (e.g., an assailant's contact with a victim's skin).

The rare-earth metal-containing particles can be prepared in aqueous or organic solvents by dissolving one or more rare-earth metals, at a concentration of 1 mM to 10 M, and adding an organic chelating agent (e.g., terephthalate and/or derivatives thereof) to a final concentration of 1 mM to 10 M at a ratio of between 1:10 to 10:1 rare-earth metal to organic chelator (either in organic or aqueous solvents). The chelator can be added as a powder or can be separately dissolved in an aqueous or organic solvent and then added. Alternatively, the chelator (e.g., organic multidentate compound) can be first dissolved at a concentration of 1 mM to 10 M followed by the addition of the rare-earth metal in a similar fashion. The synthesis conditions can be carried out at room temperature without any additional energy input, although one or more of ultrasound, microwaves, mechanical mixing, and flow reactions can also be used to facilitate synthesis. Additional functional cargo such as magnetic nanoparticles, enzymes, nanoparticles, and/or fluorophores can be incorporated during the synthesis stage by adding the functional cargo before adding the respective final component; i.e., either the rare-earth metal or chelator depending on the order of steps. Other additional components such as various microparticles can be incorporated in the composition. This can allow the rare-earth metal-containing porous particles to be coupled with or coated onto current forensic powders, thereby retaining the fluorescence or other positive aspects of the current forensic powder, while still harnessing the binding specificity of the rare-earth metal-containing porous particles.

Mixing of the rare-earth metal and the chelator results in a precipitate, where the precipitate can be collected in various ways (e.g., centrifugation, filtration, etc.) and used as-is, or the respective sedimented product or filtrate can also be washed one or more times and include subsequent centrifugation/filtration steps. The precipitate can optionally be washed at least once to create pores therein and to remove unchelated rare-earth metal and unreacted chelator. The washing can be conducted with aqueous or organic solvents, where harsh solvents such as acetone, or high concentration piranha, hydrochloric acid, sodium hydroxide, etc. are typically avoided. The precipitate can then be dried using heat and/or vacuum. In certain instances, significant bound moisture may need to be removed before the full range of applications described herein can be targeted. After drying, the precipitate can form a cake that can either be used directly by gently brushing a forensic brush along the cake (e.g., similar to makeup blush), or for ideal use, the precipitate can be processed into a powder (e.g., ground with a mortar and pestle), where the powder can comprise particles smaller than 10 micrometers in at least one dimension, including where the particles have an average diameter in all three dimensions of about 10 micrometers or less.

As a cake or powder, the rare-earth metal-containing particles can be used with standard forensic brushes, although feather dusters and fine brushes can improve effectiveness in certain circumstances. The rare-earth metal-containing particles can be used on any surface for detecting any physical forensic prints or marks. Moreover, the powder can be directly thrown or projected onto a surface to detect the latent prints or marks. For example, this can be accomplished by blowing the powder onto a surface or aerosolizing the powder and depositing the powder on the surface. The particles cannot be overloaded onto a brush or print due to their specificity in reacting with biomolecules. The particles can also be used in controlled environments or in field environments.

Alternatively, the dry powder can be dispersed (between 0.0001% and 5% by weight) in a liquid carrier (e.g., aqueous or organic solvents), and the surface to be analyzed can be dipped into the dispersion. The dispersion can also be sprayed onto the surface to be analyzed or gently sprinkled or overlaid onto the surface. These deployment methods can allow for the detection of latent prints on wet surfaces without the need for drying, where drying may negatively affect the surface or the underlying material. These deployment methods for the rare-earth metal-containing particles also facilitate their use with current forensic protocols using sprays to detect latent prints or marks in large areas having extensive surface types and surface areas. Following contact of the rare-earth metal-containing particles, whether the particles are in the form of a cake, powder, or dispersion, the surface can be gently washed or dusted to remove any loosely bound particles.

The rare-earth metal-containing particles can be imaged without any excitation light as a standard white or colored powder depending on the cargo or lack of it. Latent prints and marks can be lifted using standard procedures (e.g., tape, etc.), and can be placed onto a card and/or imaged. The particles can be imaged under standard white light or using a variety of specific excitation lights. In particular, europium, terbium, lanthanum, and dysprosium exhibit strong fluorescence using 250-280 nm light, but limited fluorescence using 280-380 nm. Therefore, standard shortwave UV lights (e.g., 254 nm) are recommend for fluorescence imaging, as this also reduces the possibility of autofluorescence from many background surfaces. The particles can also be excited at 350-430 nm light (UV and blue light) for fluorescence imaging. Moreover, europium-based particles can be excited at 500-700 nm (green to red light) light for fluorescence imaging. The excitation can be on the native surface, after lifting the print or mark, or after transfer of the print or mark to a card. Certain types of tape can absorb UV light (~280-380 nm) and can interfere with imaging of the print or mark. As such, the rare-earth metal-containing particles can be selected or configured to fluoresce outside of the absorbance range of certain tapes used for lifting latent prints and marks, where fluorescence of the particles at different wavelengths of light from the tape allows imaging after lifting and placing the print or mark on a card. In certain embodiments, near-infrared light can also be used as an excitation and emission source as most materials do not have a strong IR fluorescence signal and therefore any background fluorescence can be very low.

Rare-earth metals are defined by the fifteen lanthanides as well as scandium and yttrium; e.g., cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). Preferred rare-earth metals for use in the present technology include europium, terbium, lanthanum, dysprosium, and combinations thereof. One caveat is that the rare-earth metal or combination of rare-earth metals selected for use in the present technology must provide fluorescence suitable for imaging under the conditions to be employed. For example, IR or near IR fluorescence can be used for detecting prints on UV sensitive surfaces, where shortwave UV can be used on surfaces that are minimally damaged or not damaged by application of UV at 254 nm or less.

Chelators include various organic compounds with various denticities that form a coordination complex with one or more rare-earth metals. The chelator can be also be referred to as a polydentate or multidentate ligand that binds the rare-earth metal(s) using various numbers of atoms, where it is possible that not all potential binding sites are used in the forming the coordination complex. Examples of chelators include various organic compounds, including various aromatic and non-aromatic compounds. Binding sites for the rare-earth metal on the chelator can include various electronegative atoms, including atoms and functional groups having formal negative charges, including various salt forms of such chelators. Examples include chelators having one or more carboxylic acid groups, including various salt forms thereof, such as the bifunctional 1,4-benzenedicarboxylate (BDC) and the trifunctional 1,3,5-benzenetricarboxylate (BTC). Other examples of suitable chelators include various polyphenols, such as tannic acid, and various trihydroxybenzoic acids, such as gallic acid.

Various compounds can be incorporated as cargo components into particles formed by the rare-earth metal and the chelator. Cargo compounds or components can fill voids within the particles and can be incorporated into pores within the particles. Porosity of the particles can be tailored to adjust the amount of cargo incorporated therein. Examples of cargo compounds or components include fluorescent organic molecules, fluorescent inorganic molecules, various dyes, magnetic materials, and enzymes.

The rare-earth metal and the chelator can form a metal-organic framework that includes one or more types of rare-earth metal ions or clusters coordinated to the chelator to form one-, two-, or three-dimensional structures. The metal-organic framework can typically form a three-dimensional particle or cake that can be milled or ground to a particular particle size. The metal-organic framework formed by the rare-earth metal and the chelator can be referred to as a coordination polymer and can often be porous, where various amounts, types, and combinations of one or more rare-earth metals and/or combinations of one or more chelators can present different porosities, including changes in the number and/or size of pores for a given particle size. The metal-organic framework, for example, can be described as a coordination network with the chelator, as one or more organic ligands, containing potential voids. The coordination network is a coordination compound extending, through repeating coordination entities, in one dimension, and can include cross-links between two or more individual chains, loops, branches, or a coordination compound extending through repeating coordination entities in two or three dimensions, and can include a coordination polymer including a coordination compound having repeating coordination entities extending in one-, two-, or three-dimensions. In some cases, the pores within the metal-organic framework formed by the rare-earth metal and the chelator can be stable following elimination of one or more various guest molecules (e.g., various solvents), where the pores can then be filled or partially filled with other compounds, and/or a portion of the guest molecules can be exchanged with other compounds.

A particularly advantageous aspect of the compositions including particles formed of the rare-earth metal and the chelator is that the particles cannot be overloaded onto prints or marks as the particles do not bind to the vast majority of surfaces encountered in forensics. This makes the particles especially useful for certain surfaces that have so far been unsuitable and out of the operational range of other forensic powders, where such can include cotton (e.g., money and clothes), wood (e.g., wood handled tools, weapons, etc.), guns, cell phones, car interiors and exteriors, leather (e.g., wallets, car seats, chairs, etc.), and so on. In certain embodiments, particles can be applied to a surface to the point where an excess of the particles is removed therefrom, leaving particles bound to latent prints or marks. Unbound and excess particles can be removed by brushing, vacuuming, gravity, use of a magnet (where the particles are magnetic), and/or shaking the particles from the applied surface, among other means.

Of particular note, the present rare-earth metal-containing particles can be used to detect latent prints on skin, as excitation by visible light minimizes autofluorescence of skin by UV. For example, UV is regularly used to determine an extent of skin damage as the skin glows under strong longwave UV. Short wave UV is not thought to penetrate the skin, and visible green or orange light does not lead to any damage or autofluorescence. Skin has thus far been inaccessible for the detection of latent prints as the similarities between skin and prints are too close for other commercial and academic methodologies for detecting latent prints. However, the present rare-earth metal-containing particles are able to detect biomolecules deposited on skin, such as where one person has touched or contacted another person's skin. The ability to detect contact and presence of a latent print or mark on a skin surface can greatly improve forensic analyses. Even the ability to show outlines or portions of latent prints and marks can contribute in a great way to the identification of domestic violence perpetrators, not to mention the ability to collect forensic evidence on the skin of rape and murder victims and the potential to identify latent prints related to criminal suspects. The present rare-earth metal-containing particles can therefore provide substantial advantages in analyzing prints and marks on live and dead skin surfaces.

Another important aspect of the rare-earth metal-containing particles is that these particles bind to biological human, animal, and plant fluids, whether wet or dry; e.g., blood, semen, saliva, vomit, feces, oils, foods, perspiration, and sebaceous fluids. Moreover, they also bind to synthetic fluids when imprinted with latent prints and marks. Most latent print powders are limited to use in detecting wet sebaceous fingerprints, but the present rare-earth metal-containing particles can detect dry latent prints and wet latent prints of hands, feet, lips, etc. This makes the present particles substantially more useful for skin analyses, and more valuable as an all-purpose powder that can be applied everywhere for detecting latent prints and marks on all types of surfaces. Certain forensic procedures can require that certain powders, sprays, and fumes are used separately, where identifying which ones should be used for which surface or substrate can be crucial, as most prints can be destroyed or irreversibly changed depending on the detection process employed. Therefore, having a generalist powder, as provided by the present technology, can remove these issues. What is more, certain chemical groups and functionalities can be incorporated into the rare-earth metal-containing particles and multidentate chelators to allow for further chemical modification and for integration with various sprays and fumigants used in secondary detection methods.

Compositions including the rare-earth metal-containing particles can be made DNA-free and the particles do not harm DNA, making the particles useful when applied to prints that may contain crucial genetic information. Inclusion or contamination of the present particles into DNA swabs does not pose any issues with DNA analyses, where methods using DNA amplification (e.g., polymerase chain reaction or PCR) can be performed without negative side-effects. This importantly allows the identification of latent prints and marks which can then be followed by DNA detection, sequencing, and/or genetic identification on the same surface or using the actual biomolecules in the print or mark detected and identified by the particles.

Various compositions including the rare-earth metal-containing particles can be formed and used. These include various colored particles, particles having particular fluorescence properties, and particles that include additional functional properties. As one example, colored (e.g., yellow) particles can be formed as follows. Disodium terephthalate ($Na_2BDC$) can be dissolved at a concentration of 0.25 M in 1 L water and separately a mixture of terbium chloride and europium chloride can be dissolved at 0.125 M each in 500 mL of water. These solutions can be combined together in a large flask and thoroughly mixed by shaking or sonication, for example. The resulting precipitate can then be collected by filtration or centrifugation and can be dried for use. Various intermediary binders and chelators or organic linkers other than BDC, such as tannic acid, gallic acid, benzyl tricarboxylate, etc. can be used in combination with, or instead of, BDC for anchoring purposes between any cargo components and the rare-earth metal porous particles, to bind the rare-earth metal, or to shift the excitation/emission wavelengths. Appropriately strong chelation groups including catechol, galloyl, and/or carboxylate groups can be used to provide stability (e.g., moisture, temperature, light stability, etc) to the powder and robust linking and anchoring to the cargo. As another example, magnetic particles can be formed as follows. The aforementioned metal salt solutions for the colored (e.g., yellow) particles can be mixed with iron oxide at an iron oxide weight concentration between 0.01% and 5%. As yet another example, colored (e.g., pink) particles can be formed as follows. The aforementioned metal salt solutions can be mixed with organic dye fluorophores, such as rhodamine, at weight concentrations between 0.001% and 5%. As still another example, chemical functionality can be added to the particles, where a disodium terephthalate derivative, such as amino-terephthalate, can be used in conjunction or in place of $Na_2BDC$ in the above formulations. The rare-earth metal-containing particles can be observed using various wavelengths of light, as described herein. For example, the particles can be excited using wavelengths of light between 200-280 nm, 350-440 nm, and other ranges in the visible light spectrum depending on the metal salt used. For example europium-based particles can be excited roughly between 500-700 nm.

EXAMPLES

Example embodiments of the present technology are provided with reference to the several figures enclosed herewith. Examples 1-3 relate to dry powder compositions of the rare-earth metal-containing particles that are applied using a brush, examples 4-5 relate to dispersed rare-earth metal-containing particles that are applied to wet and dry surfaces, and example 6 relates to a dry powder of the rare-earth metal-containing particles that is applied onto a large surface.

Example 1: Use of the Dry Powder for Identifying Latent Fingerprints on Skin

A powder of Tb/BDC particles is gently applied to a standard forensic brush (e.g., horse hair or synthetic) or a cotton ball/pad. The brush or cotton is then very gently moved over the skin area either in brushing strokes or by gently dabbing. The skin area is then checked under the appropriate wavelength of UV light or visible light (in this instance with Tb/BDC, 254 nm) to check for print outlines. The powder can then be reapplied numerous times to develop the print to the appropriate level of detail with intermittent checking under UV light. Although the powder does not overload prints on synthetic substrates, the powder can potentially overload skin prints depending on ambient conditions, therefore intermittent checking by UV is suggested. The prints can then be photographed directly on skin under the appropriate wavelength of light, or the prints can be lifted from the skin and post-processed and imaged.

FIG. 1 shows an example of latent fingerprints 100 with visible ridge detail on skin 110 detected using Tb/BDC powder and illumination by 254 nm UV light 120 projected from a lamp 130.

Figure 2:
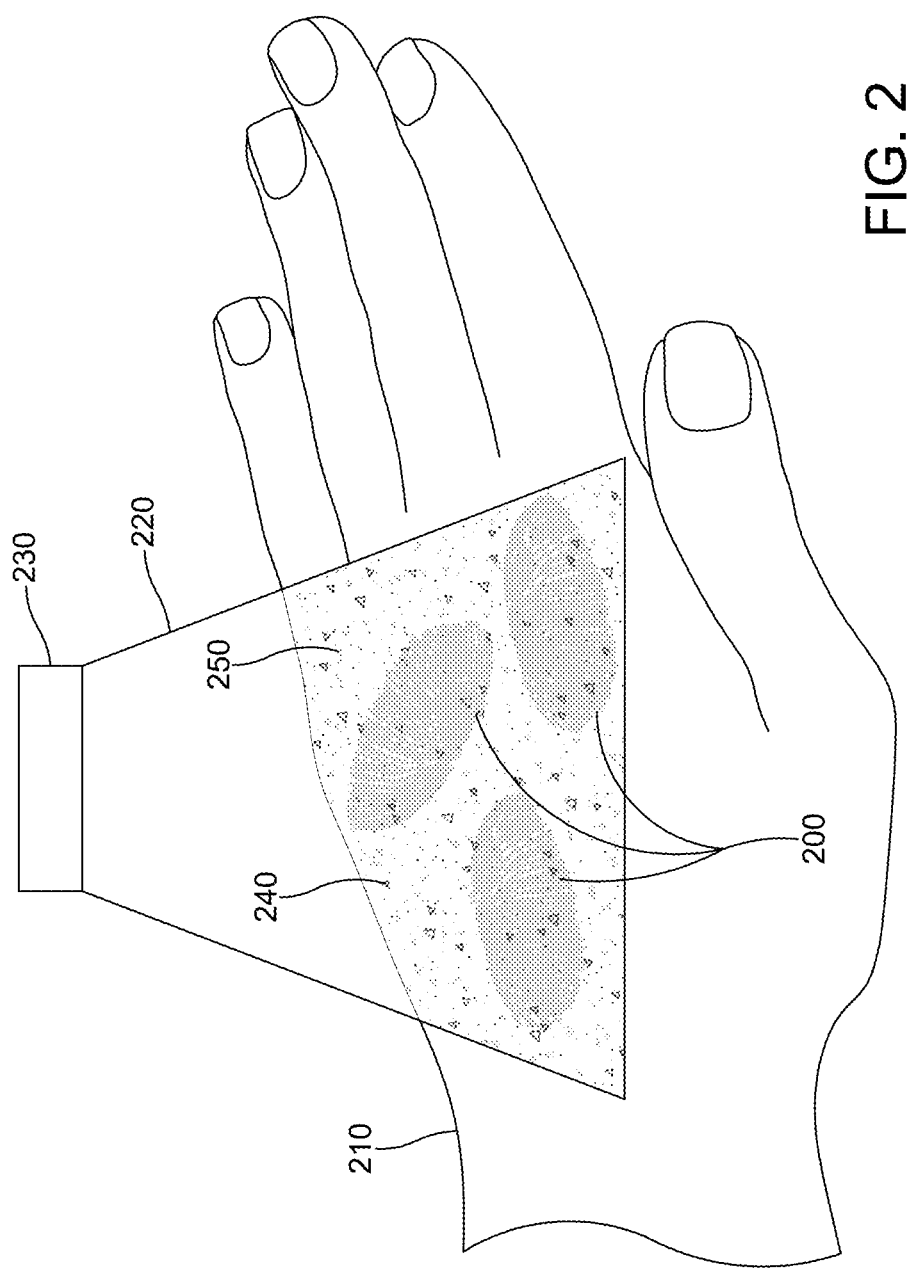
FIG. 2 is a photograph of latent fingerprints on skin using Tb-BDC and Eu-BDC powder.

FIG. 2 shows an example of detecting latent fingerprints 200 on skin 210 using Tb&Eu/BDC powder and illumination by UV light 220 projected from a lamp 230, where the Tb&Eu/BDC powder includes Tb-BDC particles 240 and Eu-BDC particles 250.

Example 2: Use of Dry Powder to Detect Bloody Fingerprints on a Machete Handle A powder of Tb/BDC particles is gently applied to a standard forensic brush. The machete handle in question is then brushed extensively but gently with the forensic brush. Simultaneously, a handheld UV shortwave light (with appropriate safety shielding) can be used to monitor the development of the prints. Even if the handle has been bleached the prints can still be visible. The prints can then be imaged or lifted for imaging and DNA analysis.

Example 3: Use of Dry Powder to Detect Muddy Bootprints on a Linoleum Floor

A powder of Tb/BDC particles is gently applied to a standard forensic brush. The floor in question is then brushed extensively but gently with the forensic brush. Simultaneously, a handheld UV shortwave light (with appropriate safety shielding) can be used to monitor the development of the prints. The prints can then be imaged or lifted for imaging and DNA analysis.

Example 4: Use of Dispersed Powder to Detect Latent Fingerprint on Wet or Dry Glass A dispersion of Tb/BDC particles is formed in water at a weight ratio of 0.1%. The powder and water solution can be shaken vigorously to disperse the powder. The dispersion can then be gently sprayed or poured over the glass with simultaneously monitoring using handheld UV shortwave light (with appropriate safety shielding). More dispersed powder can be added if necessary, or alternatively pure water can be gently sprayed or poured over the glass to wash away weakly bound or non-specifically bound powder without washing away the latent prints. The prints can then be imaged without the need for drying, or can be imaged and lifted after drying with potential subsequent DNA analysis.

Figure 3:
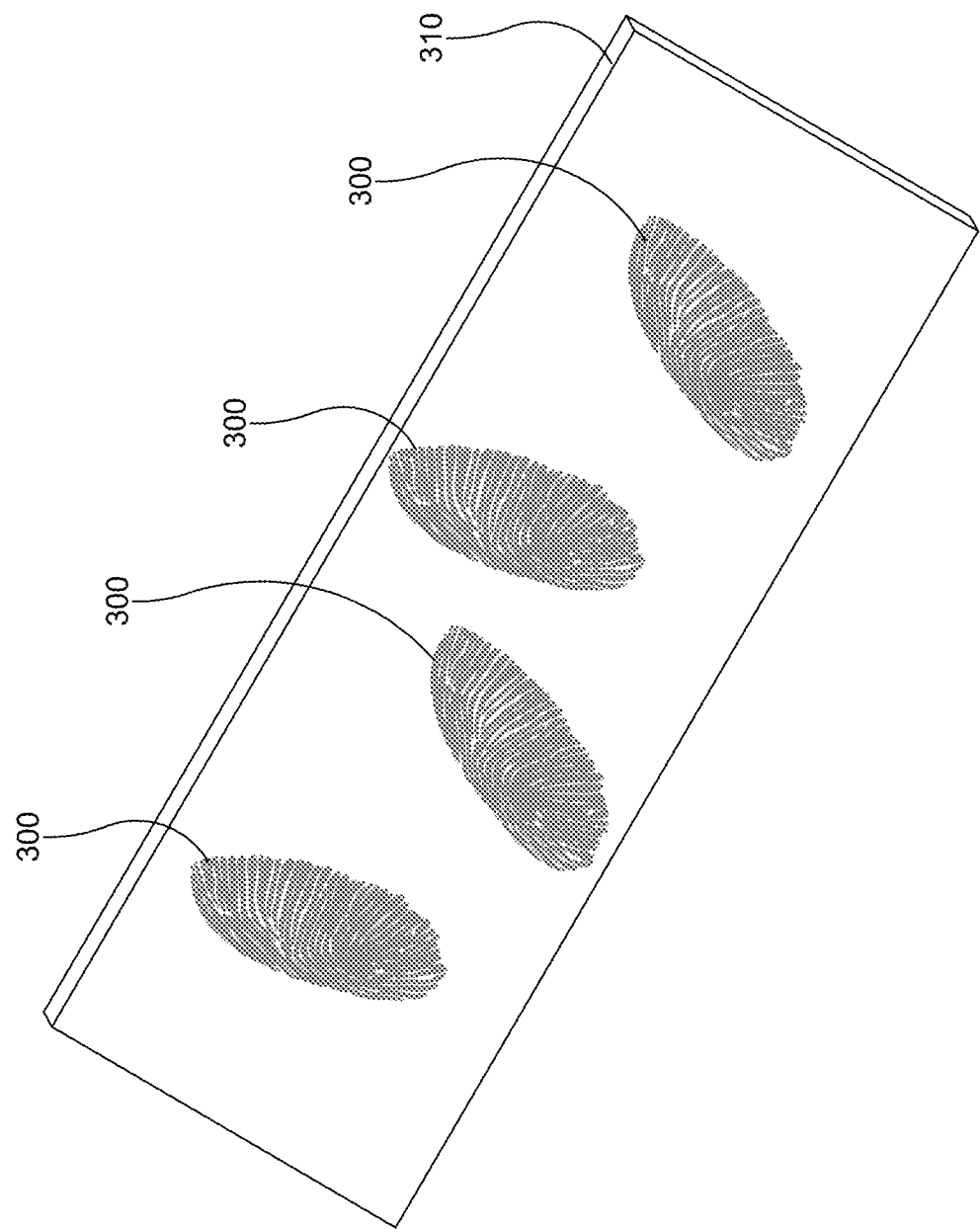
FIG. 3 is a photograph of wet latent fingerprints on glass detected by Tb-BDC powder dispersed in water, sprayed onto the glass, and followed by rinsing the glass with water.

FIG. 3 shows wet latent fingerprints 300 on glass 310 detected by the Tb/BDC powder dispersed in water that was sprayed onto the glass 310 followed by rinsing the glass 310 with water.

Example 5: Use of Dispersed Powder to Detect Fingerprints on a Gun

A dispersion of Tb/BDC particles is formed by addition of powder to 1 L of water at a weight ratio of 0.1%. The powder solution can be shaken vigorously to disperse the particles. The gun is immersed briefly for 5 seconds in the dispersed powder and removed and immersed in clean water to remove non-specific powder. The development of the prints can be monitored using handheld UV shortwave light (with appropriate safety shielding). If necessary, the immersion process can be repeated any number of times using 5 s immersion steps. The prints can then be imaged without the need of drying, or can be imaged and lifted after drying with potential subsequent DNA analysis.

Example 6: Use of Dry Powder Projected onto a Crime Scene Wall, Floor, and Furniture for Rapid Detection of Latent Prints A powder of Tb/BDC particles is placed on a gloved hand and blown into a crime scene to contact the walls, floor, and furniture therein. Appropriate protective equipment can be worn during this time and no one is allowed in the room until the powder settles. After waiting for 30 min for the powder to settle and attach, the development of the prints can be monitored using handheld UV shortwave light (with appropriate safety shielding), and the process can be repeated if necessary. The whole room can then be imaged and individual prints (e.g., hand, finger, foot, lip, boot, etc.) can be imaged and lifted with potential subsequent DNA analysis.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of detecting physical forensic evidence on a surface comprising:
   contacting the surface with a composition, the composition including a rare-earth metal and a chelator, wherein the composition includes a porous metal-organic framework of the rare-earth metal and the chelator operable to physically bind to physical forensic evidence;
   illuminating the composition contacting the surface with electromagnetic radiation configured to cause the composition to fluoresce in a pattern indicative of physical forensic evidence;
   capturing the pattern indicative of physical forensic evidence.

2. The method of claim 1, wherein the composition comprises a plurality of particles, each particle including the rare-earth metal and the chelator.

3. The method of claim 2, wherein each particle is about 10 micrometers or less in at least one dimension.

4. The method of claim 1, wherein the porous metal-organic framework of the rare-earth metal and the chelator includes pores ranging in diameter from about 0.01 nm to about 50 nm.

5. The method of claim 1, wherein the rare-earth metal includes a member of a group consisting of: dysporium, europium, lanthanum, terbium, and combinations thereof.

6. The method of claim 1, wherein the chelator includes an organic multidentate compound.

7. The method of claim 1, wherein the chelator includes a member of a group consisting of: 1,4-benzenedicarboxylate; 1,3,5-benzenetricarboxylate; a polyphenol, a trihydroxybenzoate; and combinations thereof.

8. The method of claim 1, wherein the composition includes a dispersion of the rare-earth metal and the chelator in a liquid carrier.

9. The method of claim 8, wherein the contacting includes spraying the dispersion onto the surface.

10. The method of claim 1, wherein the composition includes a powder of the rare-earth metal and the chelator.

11. The method of claim 10, wherein the contacting includes dusting the powder onto the surface.

12. The method of claim 1, wherein the physical forensic evidence includes a member selected from a group consisting of: blood, semen, saliva, vomit, feces, oil, food, perspiration, sebaceous fluid, and combinations thereof.

13. The method of claim 1, wherein the physical forensic evidence includes a latent print.

14. The method of claim 1, wherein capturing the pattern indicative of physical forensic evidence includes recording or photographing the pattern indicative of physical forensic evidence.

15. The method of claim 1, wherein capturing the pattern indicative of physical forensic evidence includes lifting the pattern indicative of physical forensic evidence from the surface.

16. The method of claim 1, wherein the composition further includes a cargo component.

17. The method of claim 16, wherein the cargo component includes a member selected from a group consisting of: a fluorophore, a magnetic component, a compound having a functional group not present in the chelator, and combinations thereof.

18. A method of making a composition for detecting physical forensic evidence on a surface, the method comprising:
    combining a rare-earth metal, a chelator, and a solvent to form a solution;
    precipitating the rare-earth metal and the chelator in the solution; and
    isolating the precipitate of the rare-earth metal and the chelator from a remainder of the solution, wherein the precipitate includes a porous metal-organic framework of the rare-earth metal and the chelator.

19. A composition for detecting physical forensic evidence comprising a porous metal-organic framework of a rare-earth metal and a chelator, wherein the porous metal-organic framework of the rare-earth metal and the chelator includes pores ranging in diameter from about 0.01 nm to about 50 nm.

20. The composition of claim 19, further including a cargo component.

* * * * *